M. S. KENNEY.
COFFEE ROASTING DEVICE.
APPLICATION FILED SEPT. 14, 1915.
1,200,424.
Patented Oct. 3, 1916.
2 SHEETS—SHEET 2.
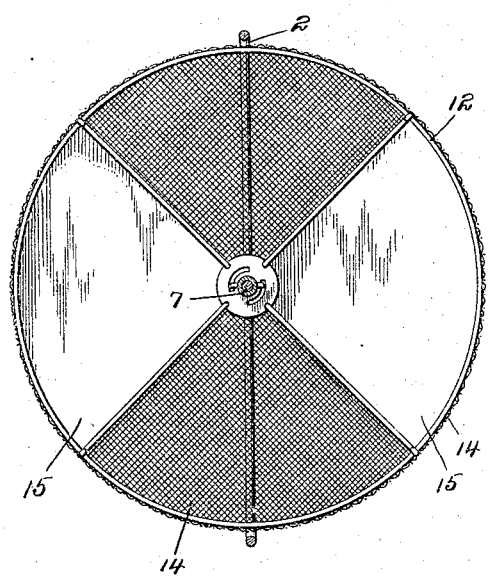
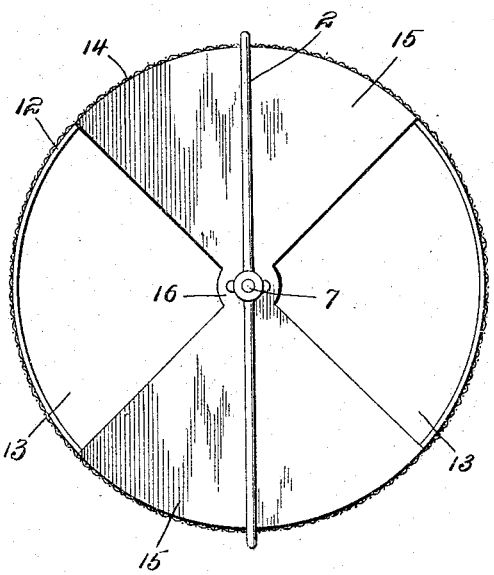
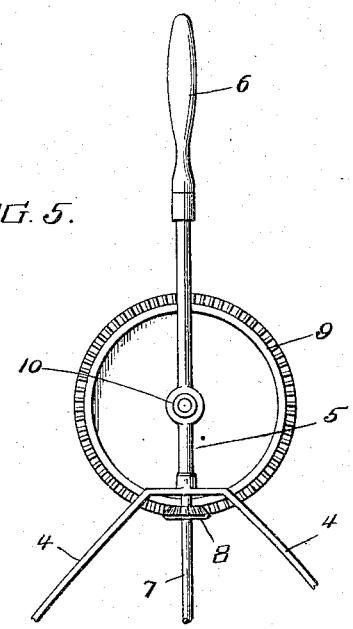
Witnesses
A. C. Newkirk
C. C. Hines
Inventor
M. S. Kenney.
By Victor J. Evans
Attorney

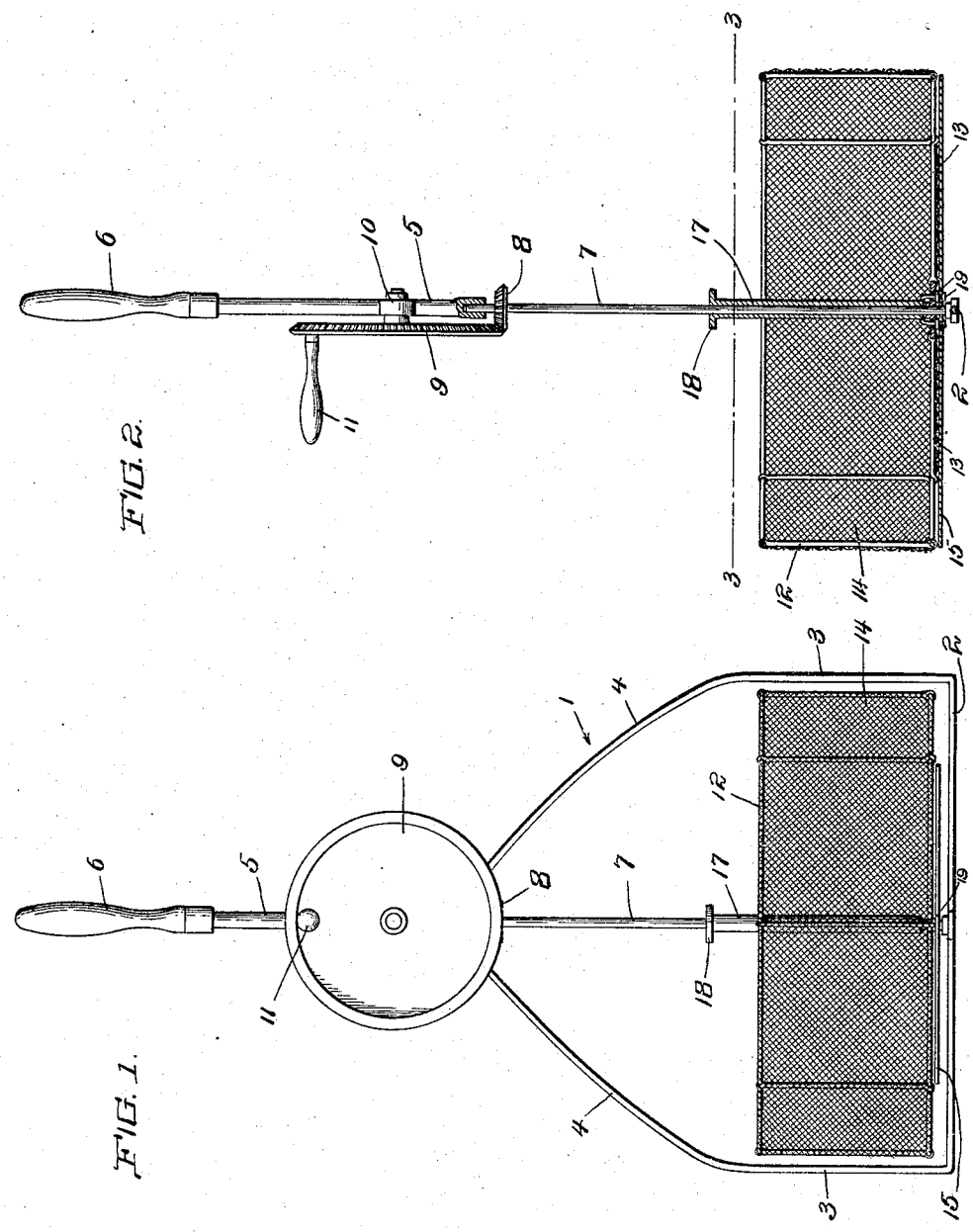

UNITED STATES PATENT OFFICE.

MARTIN S. KENNEY, OF NEW ORLEANS, LOUISIANA.

COFFEE-ROASTING DEVICE.

1,200,424.  Specification of Letters Patent.  Patented Oct. 3, 1916.

Application filed September 14, 1915. Serial No. 50,647.

*To all whom it may concern:*

Be it known that I, MARTIN S. KENNEY, a citizen of the United States, residing at New Orleans, in the parish of Orleans and State of Louisiana, have invented new and useful Improvements in Coffee-Roasting Devices, of which the following is a specification.

This invention relates to a device for roasting coffee, and particularly to a device for use in roasting coffee by dipping or submerging it in a bath of hot liquid, such as cotton seed oil.

One object of the invention is to provide a device of this character by means of which the green coffee berries may be submerged in the liquid until roasted, the stones, gravel or other impurities separated from the coffee, and the excess of oil removed from the surface of the roasted coffee in a convenient, efficient and rapid manner.

A further object of the invention is to provide a coffee roasting device which is simple of construction, convenient in use and comparatively inexpensive of production, so that it may be employed by householders and small dealers preferring to roast their own coffee.

The invention consists of the features of construction, combination and arrangement of parts herein fully described and claimed, reference being had to the accompanying drawings in which:—

Figure 1 is a side elevation of a coffee roasting device embodying my invention. Fig. 2 is a vertical section through the same, showing the closure in closed position. Fig. 3 is a sectional plan view on the line 3—3 of Fig. 2. Fig. 4 is a bottom plan view showing the closure in open position. Fig. 5 is a detail view looking toward the supporting bracket at a different angle from that shown in Fig. 1.

In carrying my invention into practice, I provide a suitable supporting frame 1, preferably formed of wire and comprising a bottom bar 2, side bars 3 and top bars 4. As shown, the side bars 3 extend upwardly at right angles from the bottom bar 2 and are connected at their upper ends with the top bars 4, which project upwardly in convergent relation and are secured at their upper ends to a supporting bracket 5 terminating in a grip or handle 6. This supporting bracket may, if desired, be composed of the extremities of a single piece of wire of which the frame as a whole is formed.

Journaled upon the bottom bar 2 at the lower end of the bracket 5 is a vertically disposed shaft 7 carrying at its upper end a pinion 8 meshing with a drive gear 9, said gear 9 being suitably journaled upon the bracket 5, as shown at 10, and provided with an actuating handle 11 whereby rotary motion may be imparted to the shaft 7 in an obvious manner.

Arranged to rotate within the frame 1 and with the shaft 7 is a roasting cylinder 12, preferably comprising a frame work of wire of a suitable gage which may be, as shown, open at the top and provided in its bottom with outlets 13, the body of the frame, with the exception of the top and outlets, being provided with a covering of a suitable mesh material 14, such as woven wire.

As shown in the present instance, the openings 13 are of V-shape or triangular form and are disposed diametrically opposite each other. These openings are adapted to be covered and controlled by means of a rotary closure or gate 15, composed of two imperforate V-shaped or triangular sections connected at their inner ends by a common attaching portion or hub 16 to each other and to the lower end of a sleeve 17, which sleeve extends upwardly about the shaft to a point above the top of the cylinder, where it is provided with a finger piece or flange 18. This sleeve is revoluble about the shaft 7 and the flange 18 provides a means by which it may be revolved from a point above the cylinder to open and close the gate 15, as will be readily understood.

The cylinder and gate are held from endwise movement on the shaft by means of suitable spacing and retaining washers 19, and the gate as shown in the present instance is arranged below or upon the underside of the cylinder, but it may be arranged within and upon the upper surface of the bottom of the cylinder, without in any manner effecting or departing from the spirit of the invention. Furthermore, if desired, the sleeve 17 and finger piece or flange 18 may be dispensed with, and the gate or closure 15 operated in any other suitable manner.

As is well known, coffee berries, after being picked, are dried upon gravel beds and then packed in sacks for storage and transportation. A large amount of gravel, stones and other foreign substances therefore becomes mixed with the green coffee and must be separated therefrom before or after the roasting process. One purpose of my invention is to provide a device by means of which the coffee will not only be roasted in a superior manner, but will also at the same time and as a part of the roasting treatment, be separated from the gravel, stones and all other refuse material.

In the use of my improved roasting device, the coffee berries to be roasted are placed in the rotating vessel or cylinder 12 and the device then dipped into a bath of heated liquid, such as cotton seed oil, heated to a temperature close to but below disintegration point. The berries are thus kept submerged in the oil during the process of roasting, which covers a greater or less period of time, according to the degree to which the coffee is to be roasted or browned. During this course of treatment the device is held within one hand of the operator, who grips the handle 6, but the device may be supported in any other preferred manner.

As the coffee berries are roasted, the moisture contained therein is driven off therefrom and bubbles up through the oil in the form of steam, which vents to the atmosphere, but as the coffee is submerged in the liquid during the entire roasting treatment the evaporation of the essential oils is prevented, and as a consequence all of the nutritious and flavor and aroma producing constitutents of the coffee are retained.

The evaporation of the moisture originally contained within the green coffee renders the coffee berries of less specific gravity than the liquid bath, and as a consequence the coffee berries rise to the surface of the liquid, the top of the cylinder being kept at a level sufficiently above the surface of the liquid to prevent the escape of the berries from the cylinder as they rise. In so rising the berries are separated from the gravel, stones and other refuse materials of greater specific gravity which descends into the bottom of the cylinder, the openings 13 in which are closed by the gate 15. These refuse substances may then be discharged by simply opening the gate 15 and allowing such substances to drop by gravity from the cylinder through the openings 13, after which the roasted coffee berries are removed by skimming them from the surface of the liquid, either by so removing them through the open top of the cylinder or accomplishing the same result by drawing the cylinder out of the liquid, after having previously closed the gate 15. The gate may be opened and closed by rotating the sleeve or by means of a suitable implement introduced into the cylinder or liquid, and after the roasting treatment or at prescribed periods the oil employed may be strained to separate it from the gathered impurities so that it may be repeatedly employed.

After the coffee is roasted and separated from its impurities as described, the roasting device is lifted out of the oil and if desired a greater or less amount of the oil may be allowed to drain from the berries and cylinder back into the oil bath. Inasmuch, however, as this will not effect the removal from the berries of an excess amount of oil, I provide a means, in the form of the shaft 7, pinion 8, gear 9 and crank handle 11 whereby the cylinder 12 may be rapidly revolved, thus causing all of the excess oil to be thrown off from the berries by centrifugal force. The surface of the berries will thus be freed from an undue amount of oil, but the pores of the coffee will be sealed by the oil and a film of oil will be left upon each berry, whereby the berry will be protected against deterioration and loss of weight and quality by the evaporation of its volatile constituents, and at the same time the berry will have imparted thereto a desirable gloss or finish superior to that usually produced by a separate and final step of an ordinary roasting process. In the use of the device, therefore, the berries will be relieved of all their impurities, roasted to the exact degree required and in a simple and inexpensive manner, pore-sealed against deterioration, and given a finishing coating, all in a single operation. Furthermore, the oil retained in the berry is of a wholesome nature and will not only add to the richness of the coffee extract, but will act as a settling agent.

While the essential elements of my roasting device may be embodied in large roasters intended for use by wholesale coffee dealers, it is primarily intended to provide a roaster which is simple enough in construction to be economically manufactured and supplied at a low cost to small dealers and wholesalers, who may be able to economically roast the coffee sold or used by them so that a fresh supply of roasted coffee may be kept on hand. Other advantages of the invention will be apparent from the foregoing description.

I claim:—

1. A device for roasting coffee comprising a frame, a perforate receptacle carried by the frame, supporting means connected with the frame whereby the device may be held suspended and submerged in a liquid coffee roasting bath, and means for rotating the receptacle to centrifugally drive off the liquid from the surface of the roasted berries.

2. A coffee roasting device comprising a frame, a rotary perforate receptacle upon the frame, means for holding the frame suspended so that the receptacle may be submerged within and withdrawn from a liquid roasting bath, a valve or gate for discharging the impurities from the bottom of the receptacle, and means for operating the same.

3. A device for roasting coffee comprising a frame, a perforate rotary receptacle mounted upon the frame and having an opening in the bottom thereof, means for rotating said receptacle, and means operable from a point above the bottom of the receptacle for covering and uncovering the said opening.

4. A device for roasting coffee comprising a frame, a perforate receptacle rotatably mounted upon the frame, said receptacle being provided with an opening in the bottom thereof, a rotary gate controlling said opening, and means for rotating said receptacle.

5. A coffee roasting device comprising a frame, a perforate cylinder revolubly supported by the frame, said cylinder having an opening in the bottom thereof, means for revolving said cylinder, a valve or gate for closing the opening in the bottom of the cylinder, an operating device for said valve or gate extending upwardly above the level of the cylinder, and means connected with the frame whereby the device may be suspended to submerge the receptable within a liquid roasting bath.

6. A coffee roasting device comprising a frame, a rotary perforate receptacle upon the frame provided with an opening in the bottom thereof, a closure for opening and closing said opening, a handle projecting above the frame whereby the device may be manipulated, and means for rotating the receptacle.

7. A coffee roasting device comprising a frame, a handle at the top of the frame, a rotary perforate cylinder mounted upon the frame, gearing for rotating said cylinder, and means for opening and closing the bottom of the cylinder from a point at an elevation above the same.

8. A coffee roasting device comprising a frame, a handle at the top of the frame, a vertical shaft journaled upon the frame, a perforate cylinder carried by said shaft and having an opening in the bottom thereof, a rotary closure governing said opening, means for turning the shaft to rotate the receptacle, and means for rotating said closure.

9. A coffee roasting device comprising a frame, a handle at the top of the frame, a shaft journaled upon the frame, a perforate cylinder fixed to the shaft for rotation therewith, said cylinder having an opening in the bottom thereof, a valve or gate for covering and uncovering said opening, an operating sleeve connected therewith and loosely surrounding the shaft and extending above the receptacle, and means for driving the shaft.

In testimony whereof I affix my signature in presence of two witnesses.

MARTIN S. KENNEY.

Witnesses:
Geo. Schmitt,
A. B. Booth, Jr.

Copies of this patent may be obtained for five cents each, by addressing the "Commissioner of Patents, Washington, D. C."